United States Patent
Trombatore

(10) Patent No.: US 6,920,313 B2
(45) Date of Patent: Jul. 19, 2005

(54) CELLULAR BASED UNIVERSAL TELEPHONE SYSTEM ADAPTED FOR BOTH CELLULAR AND LAND LINE MIMICKED SERVICE

(75) Inventor: Charles Paul Trombatore, Palatine, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 630 days.

(21) Appl. No.: 09/839,273

(22) Filed: Apr. 20, 2001

(65) Prior Publication Data

US 2002/0155819 A1 Oct. 24, 2002

(51) Int. Cl.[7] .................................................. H04B 1/40
(52) U.S. Cl. .................... 455/74.1; 455/557; 455/552.1; 455/553.1; 455/554.1; 455/555; 455/426.1; 455/462
(58) Field of Search .............................. 455/74.1, 557, 455/426.1, 426.2, 462, 463, 465, 552.1, 553.1, 554.1, 554.2, 555

(56) References Cited

U.S. PATENT DOCUMENTS

| | | | | |
|---|---|---|---|---|
| 5,526,403 A | * | 6/1996 | Tam | 455/426.1 |
| 5,675,629 A | * | 10/1997 | Raffel et al. | 455/552.1 |
| 5,787,355 A | * | 7/1998 | Bannister et al. | 455/458 |
| 5,845,203 A | * | 12/1998 | LaDue | 455/414.1 |
| 5,940,756 A | * | 8/1999 | Sibecas et al. | 455/426.1 |
| 5,953,675 A | * | 9/1999 | Rabina et al. | 455/557 |
| 6,151,500 A | * | 11/2000 | Cardina et al. | 455/435.2 |
| 6,157,846 A | * | 12/2000 | Manning et al. | 455/557 |
| 6,259,905 B1 | * | 7/2001 | Berkowitz et al. | 455/401 |
| 6,466,799 B1 | * | 10/2002 | Torrey et al. | 455/462 |

* cited by examiner

*Primary Examiner*—Marceau Milord

(57) ABSTRACT

A cellular based universal telephone system adapted for both cellular and land line service uses cellular service for both out-of-home mobile communications, and mimics land line service inside of homes by connecting one or more cellular handsets to a converter unit, which converter unit is connected to the home telephone wiring. Several off-the-shelf, non-cellular handsets can be connected to the telephone wiring (and hence to the converter unit), for answering and placing telephone calls involving the cellular telephone number. The converter unit contains a mobile converter unit and a land line interface unit. The mobile converter unit converts cellular signals from the cellular handset(s) into land line signals understandable by or needed by the non-cellular handsets, such as ringing signals, message waiting signals and call waiting tones. The land line interface unit converts signals generated by the non-cellular handsets into those understood by the cellular handset(s), such as touch tone signals, flash signals, and "end of dial" signals. The aforementioned components allow for a convenient, fully functioning telephone system relying only upon cellular service, which completely mimics a home land line telephone system when used in a customer's home, and allows the cellular handsets to function normally outside of the home.

22 Claims, 1 Drawing Sheet

Figure 1:
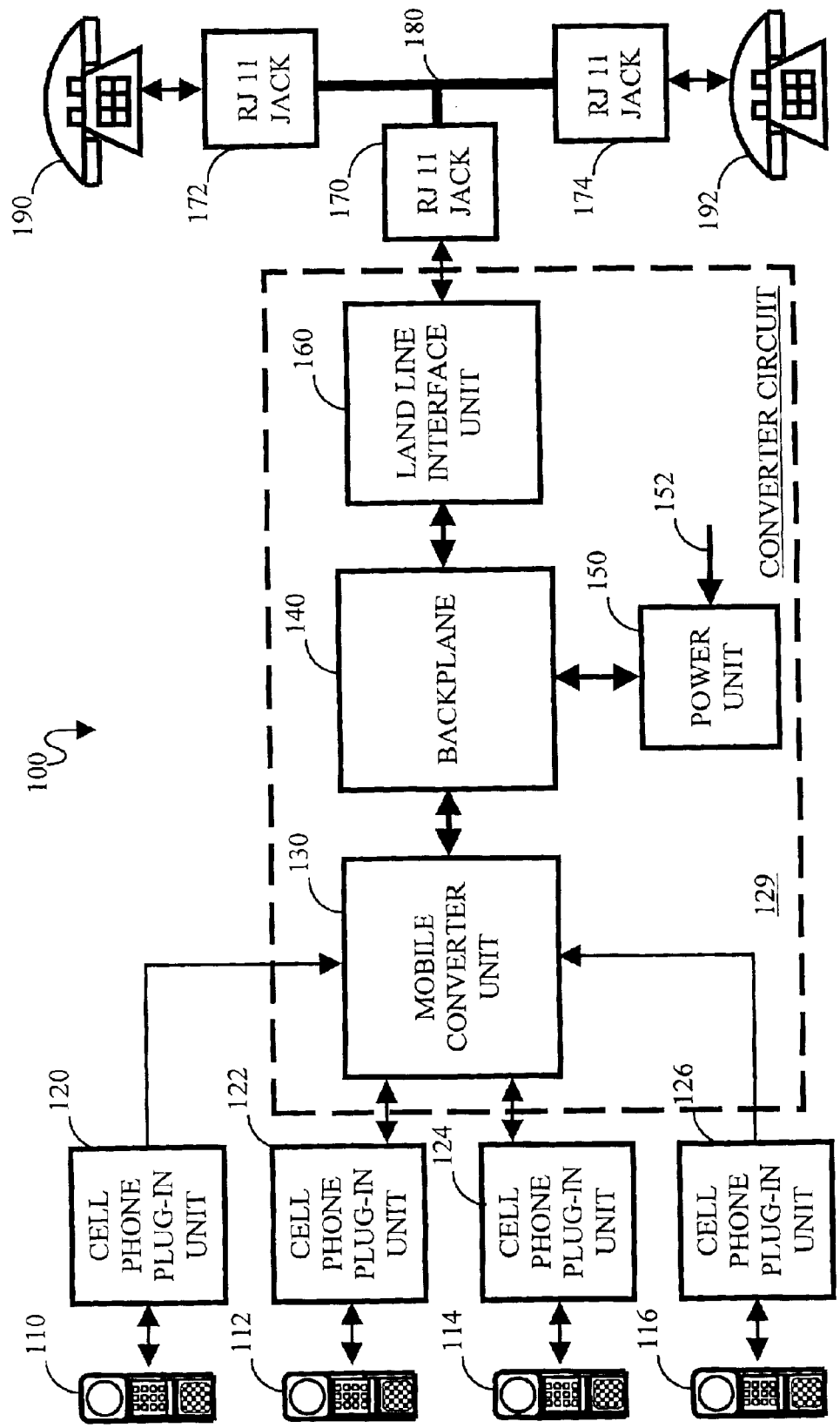

CELLULAR BASED UNIVERSAL TELEPHONE SYSTEM ADAPTED FOR BOTH CELLULAR AND LAND LINE MIMICKED SERVICE

BACKGROUND OF THE INVENTION

1. Field of the Invention

The present invention generally relates to improvements in both land line-, and cellular based telephone services.

2. Background

Many telephone customers currently have more than one type of telephone service to handle their many communication needs, considering the mobile and transitory nature of today's society. In addition to having one or more land line-based (accommodating both corded and cordless devices) telephone numbers, it is not uncommon for one or more members of the typical household to have one or more cellular telephone-based telephone numbers.

For convenience and reduction of confusion, it is desirable for a telephone customer to be able to place and receive telephone calls for both land line and cellular based service from the same handset or same group of handsets. The prior art has addressed this problem by developing special cordless handsets having dual, separate transceiver circuitry for both land line and cellular service. A customer having such a prior art device can therefore switch back and forth between transceivers to communicate under both types of services.

The above-described prior art approach has many disadvantages, not the least of which are the high cost and complexity of the special handsets needed. Not only are the handsets in such a system expensive, but the customer must still maintain both land line based and cellular based telephone services. Additionally, calls using such a system can only be handled using an expensive handset, requiring (at least in larger homes) multiple ones of the expensive handsets in a household.

In view of the aforementioned problems with the prior art, what is needed, but not taught nor suggested by the prior art are a telephone system in which the customer can freely carry the handset external to his/her home to receive and initiate cellular based telephone calls, and can receive and initiate telephone calls at home from multiple locations without the necessity of always using an expensive handset for land line telephone service.

SUMMARY OF THE INVENTION

In view of the aforementioned problem and deficiencies of the prior art, the present invention provides, a telephone system at least including a cellular telephone unit adapted for mobile cellular telephone communications, a land line telephone wiring circuit adapted to telephonically link telephonic devices, and at least one land line-based telephone unit coupled to the land line telephone wiring circuit, the land line-based telephone unit adapted for land line telephone communications. The system also at least includes a mobile converter coupled to the cellular telephone unit and to the land line telephone wiring circuit, the mobile converter being adapted to convert designated cellular signals from the cellular telephone unit into signals compatible with land line telephone service for use by the land line-based telephone unit. The system additionally includes a land line converter coupled to the land line telephone unit and to the land line telephone wiring circuit, being adapted to convert designated land line signals from the land line telephone unit into signals compatible with cellular telephone service for use by the cellular telephone unit. The system relies upon cellular service as a communication carrier.

The present invention also provides, in a telephone system, a method of telephonic communication. The steps of the method at least include providing one or more cellular telephone unit adapted for mobile cellular telephone communications, via a land line telephone wiring circuit, telephonically linking a plurality of telephonic devices, and providing at least one land line-based telephone unit coupled to the land line telephone wiring circuit, the land line-based telephone unit adapted for land line telephone communications. The method also at least includes the steps of, via a mobile converter coupled to the cellular telephone unit and to the land line telephone wiring circuit, converting designated cellular signals from the cellular telephone unit into signals compatible with land line telephone service for use by the land line-based telephone unit, and via a land line converter coupled to the land line telephone unit and to the land line telephone wiring circuit, converting designated land line signals from the land line telephone unit into signals compatible with cellular telephone service for use by the cellular telephone unit. The system relies upon cellular service as a communication carrier.

BRIEF DESCRIPTION OF THE DRAWING FIGURE

Features and advantages of the present invention will become apparent to those skilled in the art from the description below, with reference to the following drawing FIGURE, in which:

FIG. 1—the sole drawing FIGURE—is a schematic block diagram of the present-inventive universal telephone system.

DESCRIPTION OF THE PREFERRED EMBODIMENTS

To solve the problems of the prior art described supra, the present-inventive telephone system connects to land line telephone wiring circuitry, a novel converter unit. One or more conventional land line-based telephones are plugged in via standard RJ11 jacks to the household telephone wiring circuitry. One or more cellular telephones are connected to the converter unit via cellular telephone plug-in units. In the preferred embodiment, the converter unit is embodied in the same packaging, and includes a mobile converter, and a land line interface, both connected to a backplane powered by a power supply unit.

The mobile converter converts signals output by a cellular telephone and not ordinarily understood by land line telephones, into signals understood in, and compatible with land line telephone service. Likewise, the land line interface converts signals output by the land line telephones and not ordinarily understood by cellular telephones, into signals understood in, and compatible with cellular telephone service. In this way, the land line telephones mimic cellular telephones when needed, and the cellular telephones mimic land line telephones when needed. The converter unit also provides for the land line telephone units, a power source (e.g., −48 volts DC), a dial tone, and ringing signals. And, the converter unit also provides a touch tone converter to convert touch tone signals from the land line telephones to signals compatible with cellular telephone service, upon which the cellular telephones may act.

The present-inventive telephone system allows a customer to take his or her cellular telephone away from home in a conventional manner. However, the customer need not carry the cellular telephone around or have it within close proximity to receive cellular telephone calls at home. At home, a received telephone call can be completed by either going off-hook with the cellular telephone (pertaining to the destination number), or any of the connected conventional land line telephone units. Likewise (at home), cellular telephone calls can be initiated by any of the cellular telephones, or by any of the connected conventional land line telephone units.

In the preferred embodiment, outgoing calls placed from one of the conventional land line telephone units are handled by the master cellular telephone unit. In this manner, a customer can choose to use only cellular telephone service to provide all of his or her home and mobile telephone needs, if desired.

The mobile converter can be implemented to handle only one particular make of cellular telephones, or many different makes of cellular telephones as a matter of design choice.

Referring to FIG. 1, the present-inventive telephone system 100 can connect one or more cellular telephone units (110–116) via cell phone plug-in units (120–126, respectively) to a converter circuit 129. Where multiple cellular telephone units are connected, one, such as the number 110 is designated as the master unit. Also connected to the converter circuit 129 via standard RJ 11 jacks (170, 172 and 174), and home wiring circuitry 180, are standard land line telephone units, such as the ones 190 and 192.

The converter circuit 129 nominally includes a power unit (or power supply) 150 powered by an AC power source or power unit 152, a backplane 140, and connected to the backplane, a mobile converter unit 130 and a land line interface unit 160. In addition to supplying the operating voltages and currents for the converter and interface units 130 and 160, the backplane 140 also supplies to the land line interface unit 160, a conventional −48 volt DC power source, which is in turn used by the land line telephone units.

The power source 152 is also responsible for supplying the necessary current and voltage for charging the batteries of cellular telephone units connected to the system 100. In the preferred embodiment, the cords connecting the cellular telephones (110, 112, 114 and 116) to the plug-in units contain duplex communication and power pathways.

The main function of the mobile converter unit 130 is to convert signals received from a cellular telephone to those understandable by land line telephones. Examples (of cellular signals/commands needing to be converted) include ringing, Message Waiting, Call Waiting Tones, and Answer Supervision. The mobile converter unit 130 is also responsible for sending control signals to the cellular telephone units such as those pertaining to the "dialing," "send," and "end" functions.

The main function of the land line interface unit 160 is to convert signals received from a land line telephone to those understandable by cellular telephones. Examples (of land line signals/commands needing to be converted) include Dual Tone Multi-frequency (DTMF) or "touch tones," "flash," and "end of dial." The land line interface unit 160 is also responsible for generating dial tones, and actual ring signals for use by the land line telephone units.

Variations and modifications of the present invention are possible, given the above description. However, all variations and modifications which are obvious to those skilled in the art to which the present invention pertains are considered to be within the scope of the protection granted by this Letters Patent.

What is claimed is:

1. A telephone system comprising:
   at least one cellular telephone unit adapted for mobile cellular telephone communications;
   a land line telephone wiring circuit adapted to telephonically link telephonic devices;
   at least one land line-based telephone unit coupled to said land line telephone wiring circuit, said land line-based telephone unit adapted for land line telephone communications;
   a mobile converter coupled to said cellular telephone unit and to said land line telephone wiring circuit, said mobile converter being adapted to convert designated cellular signals from said cellular telephone unit into signals compatible with land line telephone service for use by said land line-based telephone unit, wherein said mobile converter comprises at least one of a Call Waiting tone converter adapted to convert Call Waiting tones received from said cellular telephone unit into signals compatible with land line service for use by said land line-based telephone unit and a Message Waiting tone converter adapted to convert Message Waiting tones received from said cellular telephone unit into signals compatible with land line service for use by said land line-based telephone unit; and
   a land line converter coupled to said land line telephone unit and to said land line telephone wiring circuit, said land line converter being adapted to convert designated land line signals from said land line telephone unit into signals compatible with cellular telephone service for use by said cellular telephone unit;
   wherein said telephone system relies upon cellular service as a communication carrier.

2. The system in claim 1, wherein said land line converter comprises a dial tone generator adapted to generate dial tones for use by said land line-based telephone unit, when said land line-based telephone unit is in the "off-hook" condition.

3. The system in claim 1, wherein said land line converter comprises a ring generator adapted to generate ring signals for use by said land line-based telephone unit.

4. The system in claim 1, wherein said land line converter comprises a Dual Tone Multi-frequency (DTMF) converter for converting DTMF signals received from said land line-based telephone unit to signals compatible with cellular telephone service for use by said cellular telephone unit.

5. The system in claim 1 further comprising a plurality of cellular telephone units, one being a master unit, and the others being slave units.

6. The system in claim 5 wherein said cellular telephone units have different calling line identification numbers.

7. The system in claim 1, further comprising a land line power source adapted to supply power to said land line telephone units, compatible with land line telephone service.

8. A telephone system comprising:
   at least one cellular telephone unit adapted for mobile cellular telephone communications;
   a land line telephone wiring circuit adapted to telephonically link telephonic devices;
   at least one land line-based telephone unit coupled to said land line telephone wiring circuit, said land line-based telephone unit adapted for land line telephone communications;
   a mobile converter coupled to said cellular telephone unit and to said land line telephone wiring circuit, said mobile converter being adapted to convert designated cellular signals from said cellular telephone unit into signals compatible with land line telephone service for use by said land line-based telephone unit; and a land line converter coupled to said land line telephone unit and to said land line telephone wiring circuit, said land line converter being adapted to convert designated land line signals from said land line telephone unit into signals compatible with cellular telephone service for use by said cellular telephone unit, wherein said land line converter comprises at least one of a "flash" signal converter for converting "flash" signals received from said land line-based telephone unit to signals compatible with cellular telephone service for use by said cellular telephone unit and an "end of dial" signal converter for converting "end of dial" signals received from said land line-based telephone unit to signals compatible with cellular telephone service for use by said cellular telephone unit, wherein said telephone system relies upon cellular service as a communication carrier.

9. The system of claim 8 further comprising a plurality of cellular telephone units, one being a master unit, and the others being slave units.

10. The system of claim 9 wherein said cellular telephone units have different calling line identification numbers.

11. The system in claim 8 wherein said land line converter comprises a dial tone generator adapted to generate dial tones for use by said land line-based telephone unit, when said land line-based telephone unit is in the "off-hook" condition.

12. The system in claim 8 wherein said land line converter comprises a ring generator adapted to generate ring signals for use by said land line-based telephone unit.

13. The system in claim 8 wherein said land line converter comprises a Dual Tone Multi-frequency (DTMF) converter for converting DTMF signals received from said land line-based telephone unit to signals compatible with cellular telephone service for use by said cellular telephone unit.

14. The system in claim 8 further comprising a land line power source adapted to supply power to said land line telephone units, compatible with land line telephone service.

15. In a telephone system, a method of telephonic communication comprising the steps of:

providing at least one cellular telephone unit adapted for mobile cellular telephone communications;

via a land line telephone wiring circuit, telephonically linking a plurality of telephonic devices;

providing at least one land line-based telephone unit coupled to said land line telephone wiring circuit, said land line-based telephone unit adapted for land line telephone communications;

via a mobile converter coupled to said cellular telephone unit and to said land line telephone wiring circuit, converting designated cellular signals from said cellular telephone unit into signals compatible with land line telephone service for use by said land line-based telephone unit including at least one of via said mobile converter, converting Call Waiting tones received from said cellular telephone unit into signals compatible with land line service for use by said land line-based telephone unit and via said mobile converter, converting Message Waiting tones received from said cellular telephone unit into signals compatible with land line service for use by said land line-based telephone unit and via a land line converter coupled to said land line telephone unit and to said land line telephone wiring circuit, converting designated land line signals from said land line telephone unit into signals compatible with cellular telephone service for use by said cellular telephone unit; and said telephone system relying upon cellular service as a communication carrier.

16. The method in claim 15, further comprising the step of providing a plurality of cellular telephone units, one being a master unit, and the others being slave units.

17. The method in claim 16 wherein said cellular telephone units have different calling line identification numbers.

18. The method in claim 15 further comprising at least one of, via said land line converter, generating dial tones for use by said land line-based telephone unit, when said land line-based telephone unit is in the "off-hook" condition and via said land line converter, generating ring signals for use by said land line-based telephone unit.

19. In a telephone system, a method of telephonic communication comprising the steps of:

providing at least one cellular telephone unit adapted for mobile cellular telephone communications;

via a land line telephone wiring circuit, telephonically linking a plurality of telephonic devices;

providing at least one land line-based telephone unit coupled to said land line telephone wiring circuit, said land line-based telephone unit adapted for land line telephone communications;

via a mobile converter coupled to said cellular telephone unit and to said land line telephone wiring circuit, converting designated cellular signals from said cellular telephone unit into signals compatible with land line telephone service for use by said land line-based telephone unit;

via a land line converter coupled, to said land line telephone unit and to said land line telephone wiring circuit, converting designated land line signals from said land line telephone unit into signals compatible with cellular telephone service for use by said cellular telephone unit including at least one of via said land line converter, converting "flash" signals received from said land line-based telephone unit to signals compatible with cellular telephone service for use by said cellular telephone unit and via said land line converter, converting "end of dial" signals received from said land line-based telephone unit to signals compatible with cellular telephone service for use by said cellular telephone unit;

said telephone system relying upon cellular service as a communication carrier.

20. The method in claim 19 further comprising the step of providing a plurality of cellular telephone units, one being a master unit, and the others being slave units.

21. The method in claim 20 wherein said cellular telephone units have different calling line identification numbers.

22. The method in claim 19 further comprising at least one of, via said land line converter, generating dial tones for use by said land line-based telephone unit, when said land line-based telephone unit is in the "off-hook" condition and via said land line converter, generating ring signals for use by said land line-based telephone unit.

* * * * *